(12) United States Patent
Petersson et al.

(10) Patent No.: US 11,532,071 B2
(45) Date of Patent: Dec. 20, 2022

(54) CREATING SUPER-RESOLUTION IMAGES

(71) Applicant: Commonwealth Scientific and Industrial Research Organisation, Acton (AU)

(72) Inventors: Lars Petersson, Acton (AU); Mehrdad Shoeiby, Acton (AU); Mohammad Ali Armin, Acton (AU); Sadegh Aliakbarian, Acton (AU); Saeed Anwar, Acton (AU)

(73) Assignee: Commonwealth Scientific and Industrial Research Organisation, Acton (AU)

( * ) Notice: Subject to any disclaimer, the term of this patent is extended or adjusted under 35 U.S.C. 154(b) by 0 days.

(21) Appl. No.: 17/345,937

(22) Filed: Jun. 11, 2021

(65) Prior Publication Data
US 2022/0207648 A1  Jun. 30, 2022

(30) Foreign Application Priority Data

Dec. 4, 2020 (AU) ................................ 2020281143

(51) Int. Cl.
*G06K 9/62* (2022.01)
*G06T 3/40* (2006.01)

(52) U.S. Cl.
CPC .......... *G06T 3/4046* (2013.01); *G06T 3/4053* (2013.01)

(58) Field of Classification Search
CPC ................................ G06T 3/4046; G06T 3/4053
See application file for complete search history.

(56) References Cited

U.S. PATENT DOCUMENTS

| 7,016,914 | B2* | 3/2006 | Nayak | G06F 16/319 |
| | | | | 707/999.102 |
| 10,304,193 | B1* | 5/2019 | Wang | G06N 3/0454 |
| 10,474,161 | B2* | 11/2019 | Huang | G01S 17/86 |

(Continued)

FOREIGN PATENT DOCUMENTS

| AU | 2020281143 B1 | 3/2021 |
| CN | 111586316 A * | 8/2020 |

(Continued)

OTHER PUBLICATIONS

Bidirectional Convolutional LSTM Neural Network for Remote Sensing Image Super-Resolution, Yunpeng Chang et al., MPDI, Oct. 9, 2019, pp. 1-18 (Year: 2019).*

(Continued)

*Primary Examiner* — Jayesh A Patel
(74) *Attorney, Agent, or Firm* — Crowell & Moring LLP (57) ABSTRACT

This disclosure relates to image processing and in particular to super-resolution of mosaic images. An image processor receives a low-resolution mosaic input image and applies a trained neural network to the low-resolution mosaic input image to generate output data of the neural network. Then, the processor creates a high-resolution mosaic output image based on the output data of the neural network. Each of the low-resolution mosaic image and the high-resolution mosaic image is represented by two-dimensional image data comprising, for each pixel, intensity values of different spectral (Continued)

bands arranged adjacent to each other in two dimensions such that each intensity value has a unique location in the two-dimensional image data.

18 Claims, 6 Drawing Sheets

(56) References Cited

U.S. PATENT DOCUMENTS

| | | | |
|---|---|---|---|
| 2008/0123097 A1* | 5/2008 | Muhammed | G01J 3/02 356/419 |
| 2011/0221599 A1* | 9/2011 | Hogasten | H01L 27/14627 |
| 2012/0294369 A1* | 11/2012 | Bhagavathy | H04N 19/573 375/240.26 |
| 2017/0345130 A1* | 11/2017 | Wang | H04N 19/172 |
| 2019/0034063 A1 | 1/2019 | Rosenberg | |
| 2019/0045168 A1* | 2/2019 | Chaudhuri | G06T 7/55 |
| 2019/0206026 A1* | 7/2019 | Vemulapalli | G06T 7/248 |
| 2019/0303717 A1 | 10/2019 | Bhaskar et al. | |
| 2020/0019860 A1* | 1/2020 | Konieczny | G06N 3/08 |
| 2020/0034948 A1* | 1/2020 | Park | G06N 3/0481 |
| 2020/0160528 A1* | 5/2020 | Rhodes | G06V 20/46 |
| 2020/0242730 A1* | 7/2020 | Shiokawa | G06T 3/4053 |
| 2021/0065334 A1* | 3/2021 | Kim | G06N 3/08 |
| 2021/0133920 A1* | 5/2021 | Lee | H04N 5/23232 |

FOREIGN PATENT DOCUMENTS

| | | | |
|---|---|---|---|
| WO | WO-2020146911 A2 * | 7/2020 | G06T 3/4053 |
| WO | WO 2020/176007 A1 | 9/2020 | |
| WO | WO-2020176007 A1 * | 9/2020 | G06N 3/0454 |

OTHER PUBLICATIONS

Hyperspectral Image Super-Resolution With a Mosaic RGB Image, Ying Fu et al., IEEE, 2018, pp. 5539-5552 (Year: 2018).*

Deep Residual Network for Joint Demosaicing and Super-Resolution, Ruofan Zhou et al., SIST, 2018, pp. 75-80 (Year: 2018).*

An end-to-end fully-convolutional neural network for division of focal plane sensors to reconstruct S0, DoLP, and AoP, Xianglong Zeng et al., Mar. 18, 2019, pp. 1-12 (Year: 2019).*

Mehrdad Shoeiby et al., 'Super-resolved Chromatic Mapping of Snapshot Mosaic Image Sensors via aTexture Sensitive Residual Network', IEEE Workshop on Application of Computer Visions (WACV), Mar. 1-5, 2020.

Notice of acceptance for patent application for Australian Patent Application No. 2020281143, dated Mar. 16, 2021 (3 pgs).

* cited by examiner

CREATING SUPER-RESOLUTION IMAGES

PRIORITY

This application claims priority to Australian Patent Application No. 2020281143, filed 4 Dec. 2020, entitled Creating super-resolution images, which is incorporated by reference in its entirety.

TECHNICAL FIELD

This disclosure relates to creating super-resolution images, such as, creating a high-resolution output image from a low-resolution input image.

BACKGROUND

Real-time snap-shot mosaic image sensors are a category of imaging devices that encompass modern RGB and multi-spectral cameras. In fact, RGB cameras are a sub-category of multi-spectral cameras, only being capable of measuring three spectral channels red, blue and green. The recent improvements have given rise to multi-spectral cameras with the performance comparable to modern RGB cameras in terms of size, portability and speed.

Despite the great interest in these devices, with applications ranging from astronomy to tracking in autonomous vehicles, they suffer from an inherent constraint: a trade-off between the spatial and the spectral resolution. The reason is the limited physical space on 2D camera image sensors. A higher spatial resolution (smaller pixel size) reduces the number of possible wavelength channels on the image sensor, and thus creates a limitation in certain applications where the size and portability are essential factors, for instance, on an unmanned aerial vehicle (UAV). A more portable (smaller and lighter) camera suffers more from lower spatial and spectral resolution. The spectral and spatial constraints of mosaic imaging devices leads to the desire for super-resolution (SR) algorithms that take a low-resolution input image from the camera sensor and create a high-resolution output image for further analysis and/or display.

Any discussion of documents, acts, materials, devices, articles or the like which has been included in the present specification is not to be taken as an admission that any or all of these matters form part of the prior art base or were common general knowledge in the field relevant to the present disclosure as it existed before the priority date of each claim of this application.

Throughout this specification the word "comprise", or variations such as "comprises" or "comprising", will be understood to imply the inclusion of a stated element, integer or step, or group of elements, integers or steps, but not the exclusion of any other element, integer or step, or group of elements, integers or steps.

SUMMARY

A method for image processing comprises:
receiving a low-resolution mosaic input image;
applying a trained neural network to the low-resolution mosaic input image to generate output data of the neural network; and
creating a high-resolution mosaic output image based on the output data of the neural network.

In some embodiments, each of the low-resolution mosaic image and the high-resolution mosaic image is represented by two-dimensional image data comprising, for each pixel, intensity values of different spectral bands arranged adjacent to each other in two dimensions such that each intensity value has a unique location in the two-dimensional image data.

In some embodiments, applying the trained neural network comprises applying a first neural sub-network comprising a sequential series of multiple steps, each step of the sequential series has an input and an output, the method further comprises using the output of one of the multiple steps as an input to perform a subsequent step in the series.

In some embodiments, each step comprises a residual group comprising:
multiple neural network layers, and
a direct connection from an input of one of the multiple neural network layers to an output of another one of the multiple neural network layers.

In some embodiments, the sequential series has exactly five steps.

In some embodiments, the multiple neural network layers comprise convolutional layers configured to operate on a receptive field that is larger for one of the convolutional layers than the receptive field of a previous one of the convolutional layers.

In some embodiments, the receptive field of convolutional layers of one of the multiple steps is larger than the receptive field of convolutional layers of a previous one of the multiple steps.

In some embodiments, the convolutional layers are configured to perform dilated convolution to increase the receptive field in each of the convolutional layers.

In some embodiments, each step comprises two convolutional layers with kernel size 3×3, dilation 1, and an output size that is identical to an input size of that step.

In some embodiments, the first neural sub-network further comprises a attention mechanism between each of the multiple steps.

In some embodiments, the attention mechanism is a self-attention mechanism configured to compute features based only on the output of the previous step.

In some embodiments, the attention mechanism comprises a sigmoid function and a tan h function.

In some embodiments, the trained neural network further comprises a second neural sub-network configured to process an ordered linear sequence of inputs, the ordered linear sequence of inputs being obtained from the output of each step of the sequential series of multiple steps of the first neural sub-network.

In some embodiments, the second neural sub-network comprises a convolutional long short-term memory (convLSTM).

In some embodiments, the method further comprises using the convolutional LSTM at the input of the second neural network to learn the sequential relationship between different wavelengths of the network.

In some embodiments, creating the high-resolution mosaic output image comprises calculating a combination of a first output feature map of the first neural sub-network with a second output feature map from the second neural sub-network.

In some embodiments, creating the high-resolution mosaic output image further comprises calculating a transposed convolution of the combination to determine a high-resolution mosaic output image from the combination of feature maps.

In some embodiments, each pixel of the low-resolution mosaic input image and the high-resolution mosaic output image comprises intensity values for more than three spectral bands.

A method for image processing comprises:
receiving a low-resolution mosaic input image;
evaluating a first neural sub-network using the low-resolution mosaic input image, the first neural sub-network comprising a sequential series of multiple steps and an attention mechanism between each of the multiple steps, the attention mechanism being configured to create a receptive field in each step that is greater than the receptive field of a previous step;
evaluating a second neural sub-network configured to process an ordered linear sequence of inputs, the ordered linear sequence of inputs being obtained from an output of each step of the sequential series of multiple steps of the first neural sub-network;
calculating a combination of a first output feature map of the first neural network with a second output feature map from the second neural network;
calculating a transposed convolution of the combination to determine a high-resolution mosaic output image from the combination of feature maps.

Software, when executed by a computer, causes the computer to perform the above method.

A computer system for image processing comprises:
an input port configured to receive a low-resolution mosaic input image;
a processor configured to:
apply a trained neural network to the low-resolution mosaic input image to generate output data of the neural network; and
create a high-resolution mosaic output image based on the output data of the neural network.

Optional features described of any aspect of method, computer readable medium or computer system, where appropriate, similarly apply to the other aspects also described here.

BRIEF DESCRIPTION OF DRAWINGS

An example will be described with reference to
FIG. 1 illustrates a single pixel of a mosaic image.

DESCRIPTION OF EMBODIMENTS

This disclosure provides a method for creating high-resolution output image from a low-resolution input image. More particularly, both the low-resolution input image as well as the high-resolution output image are mosaic images. This means each pixel comprises multiple intensity values for different respective spectral bands but each of these intensity values are associated with a different location in the image. In other words, the intensity values for the different spectral bands are adjacent to each other and not at the same location. This may also be referred to as a Bayer pattern or a mosaic image.

Mosaic Images

Figure 1:
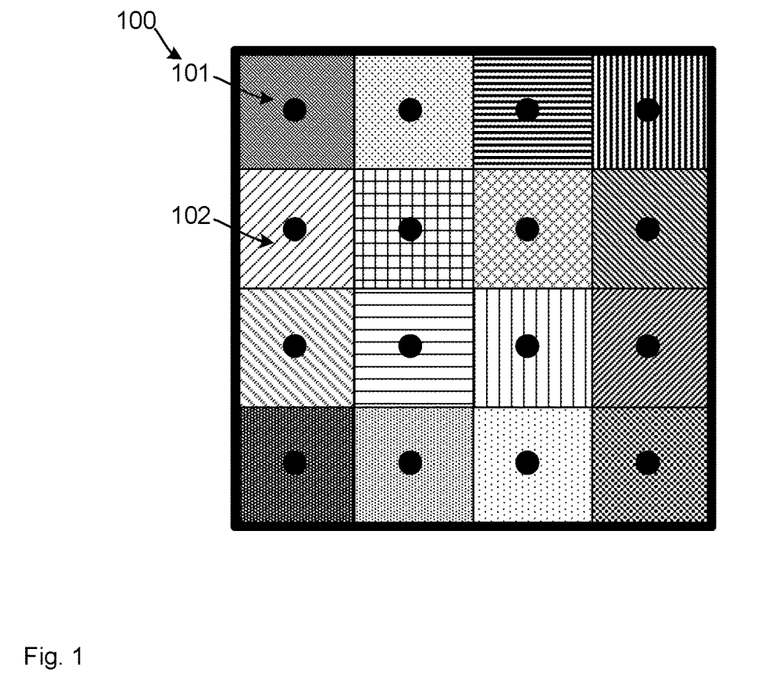

FIG. 1 illustrates a single pixel 100 of a mosaic image comprising multiple intensity values, such as a first value (represented by square 101) and a second value (represented by square 102), which are indicated by different patterns in FIG. 1. The intensity values are indicative of the intensity of light over a spectral band associated with that pixel value. Each pixel value is further assigned to a location in the image, which is represented by the relative location of squares 101 and 102 in FIG. 1. It can be seen in FIG. 1 that intensity value of square 101 is for a different location than intensity value of square 102. The locations to which the intensity values of square 101 are assigned are indicated as solid dots in FIG. 1, noting that the actual location depends on the particular implementation of an image sensor. In particular, the image sensor may have light sensitive elements (CMOS or CCD devices) that do not cover the entire chip area but have space between them for electronic circuits etc. The centre points of these light sensitive elements can be considered to be the location of that intensity value. There may further be a micro-lens in front of each light sensitive element to focus light onto that element. In that case, the centre of the micro-lens can be considered to be the location of that intensity value. In the example of FIG. 1, the pixel is a multi-spectral pixel with 4×4=16 spectral bands. In other examples, the pixel is an RGB pixel with 2×2=4 elements for three spectral bands for red, green and blue, respectively, noting that the green pixel is often duplicated.

Figure 2:
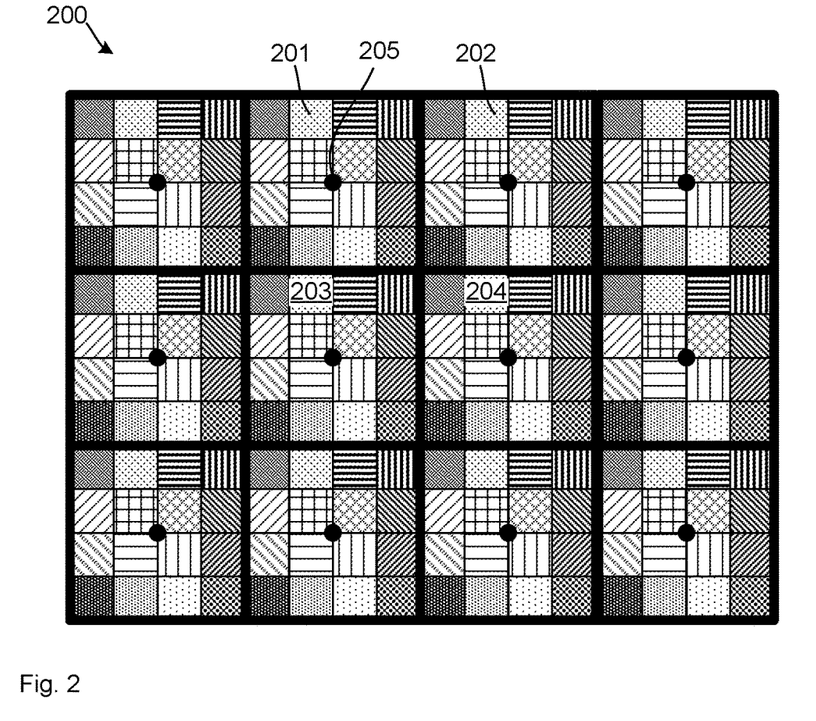
FIG. 2 illustrates a mosaic image comprising multiple instances of the pixel in FIG. 1.

FIG. 2 illustrates a mosaic image 200 comprising multiple instances of the multi-spectral pixel in FIG. 1, which are indicated by bold squares. Again, each intensity value is indicative for a light intensity at a location that is adjacent to the location of the other intensity values. In that sense, each intensity value is associated with a unique location on the image in the sense that there are no two intensity values for the same location but only a single one.

In this example, the image is a 4×3 image for illustrative purposes, noting that most practical images would have a higher resolution, such as 2,000×1,500. Further, each pixel comprises 16 different intensity values, which means the sensor captures 16 spectral bands. It is noted however, that other numbers of spectral bands are equally possible, such as three spectral bands for red, green, blue or any other number.

While the mosaic image in FIG. 2 does not appear to be useful due to the offset between intensity values, it was found that there is a significant advantage in using the mosaic image in FIG. 2 instead of an converted image.

Figure 3:
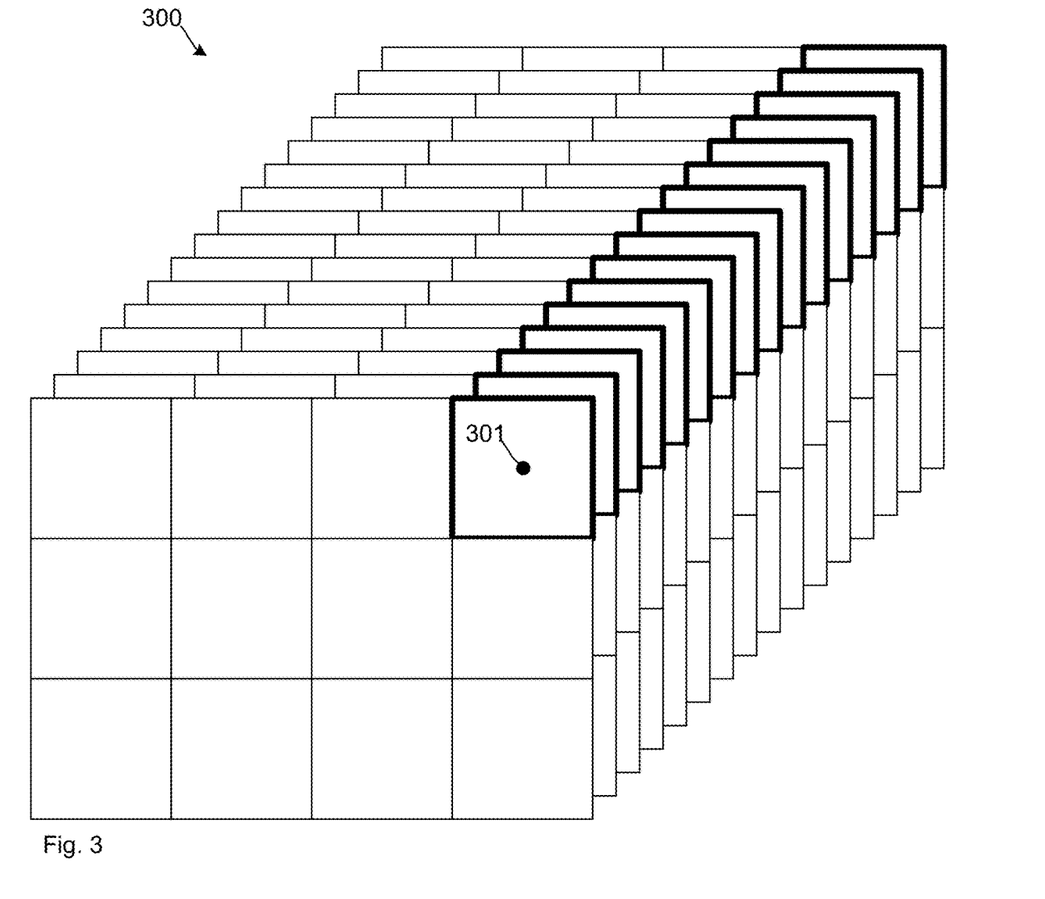
FIG. 3 shows a converted image cube.

For completeness, FIG. 3 shows a converted image, which is referred to as an RGB image for three intensity values or an image cube for more than three intensity values ("image cube" can be used for three-channel images but historically has only been used for more than three channels). Again, the image in FIG. 3 is a 4×3 image, which means the image defines 12 pixel locations. For each pixel location, such as example location 301, the image comprises multiple intensity values as indicated by bold squares for example location 301. Again, each pixel has 12 intensity values but now, these intensity values are all associated with the same pixel location. In other words, the location of each intensity value in the image is not unique but overlaps with other intensity values.

The conversion from mosaic image 200 in FIG. 2 to image cube 300 in FIG. 3 is referred to as de-Bayering, or de-mosaicing and typically involves the interpolation of intensity values in order to calculate the intensity value for the pixel location from the intensity values for the intensity value location. For example, intensity values represented by squares 201, 202, 203 and 204 in FIG. 2 are related to the same spectral band but none of them relate to the desired pixel location 205. Typically, the intensity changes between these values, which means that simply taking one value will result in a colour error and artefacts. Therefore, a two-dimensional interpolation is calculated to determine an intensity value for pixel location 205 taking into account the intensity values represented by squares 201, 202, 203 and 204.

Mosaic Super-Resolution

The methods disclosed herein take as an input a low-resolution mosaic image and outputs a high-resolution mosaic image, so both input and output images have a data structure as shown in FIG. 2. In other words, both input and output images are represented by two-dimensional image data comprising, for each pixel, intensity values of different spectral bands. These intensity values are arranged adjacent to each other in two dimensions such that each intensity value has a unique location in the two-dimensional image data.

The high-resolution and low-resolution may vary across applications, as long as the high-resolution has a larger number of pixels in total, a larger number of pixels in x-direction, or a larger number of pixels in y-direction than the low-resolution. The low-resolution may be 640×480 pixels or even lower.

Example resolutions are provided in the table below:

| Megapixels | Image Resolution |
|---|---|
| 0.3 Megapixel | 640 × 480 |
| 1.3 Megapixel | 1392 × 1024 |
| 2.0 Megapixel | 1600 × 1200 |
| 3.3 Megapixel | 2080 × 1542 |
| 5.0 Megapixel | 2580 × 1944 |
| 6.0 Megapixel | 2816 × 2112 |
| 8.0 Megapixel | 3264 × 2448 |
| 12.5 Megapixel | 4080 × 3072 |
| 32 Megapixel | 6464 × 4864 |

If the low-resolution image has a resolution in a row of the above table, then the high-resolution image may have a resolution in a row below the row of low-resolution image.

Method for Image Processing

Figure 4:
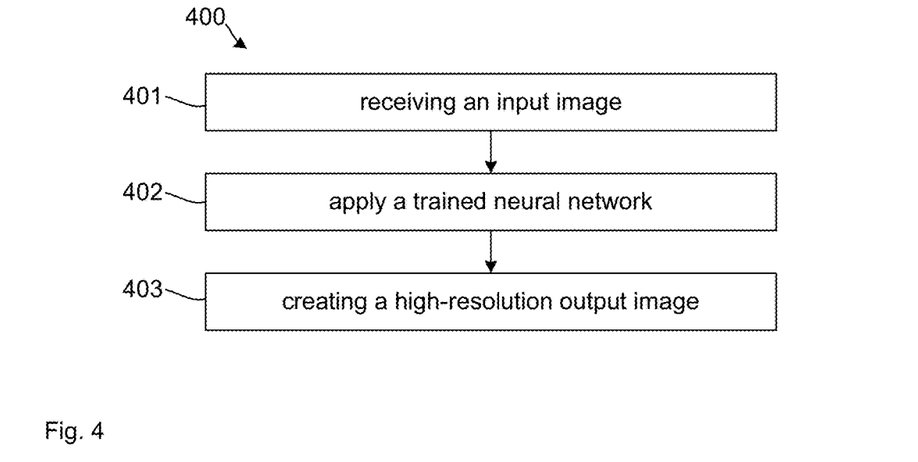
FIG. 4 illustrates a method for image processing as performed by a processor of a computer system.

FIG. 4 illustrates a method 400 for image processing as performed by a processor of a computer system. The method commences by receiving 401 the low-resolution mosaic input image. The processor may receive the input image from a camera, such as an RGB or hyperspectral cameral, in the form of raw data or from a data store, such as local data memory or remote data store, such as over the internet.

The processor then applies 402 a trained neural network to the low-resolution mosaic input image to generate output data of the neural network. The trained neural network is applied to an image that is a mosaic image. As a result, the output data of the neural network incorporates the high spatial frequency information that is available in the mosaic image. Therefore, the output data includes more information than if the neural network was applied to a de-mosaiced input image.

The neural network comprises multiple layers and each layer comprises multiple nodes. In one example, the neural network comprises convolutional layers where the nodes of that layer each calculate a convolution of the input image with a pattern stored for that node. The pattern is determined during training the neural network. The neural network is configured such that the output resolution is higher than the input resolution. More particularly, each convolutional layer calculates a convolution with a number of patterns that may be lower, higher or identical to the number of input pixels. The result of the convolution with each pattern is passed on to the next layer. In that sense, the output of a layer can also be displayed as an image but each pixel value of that 'internal' image indicates the result of the convolution with a pattern associated with that pixel. In other words, a pixel of the output image of one layer is bright if that feature is present in the input image and dark if the feature is not present. Details of the neural network are provided further below. Finally, the processor creates 403 a high-resolution output image based on the output data of the neural network.

Computer System

Figure 5:
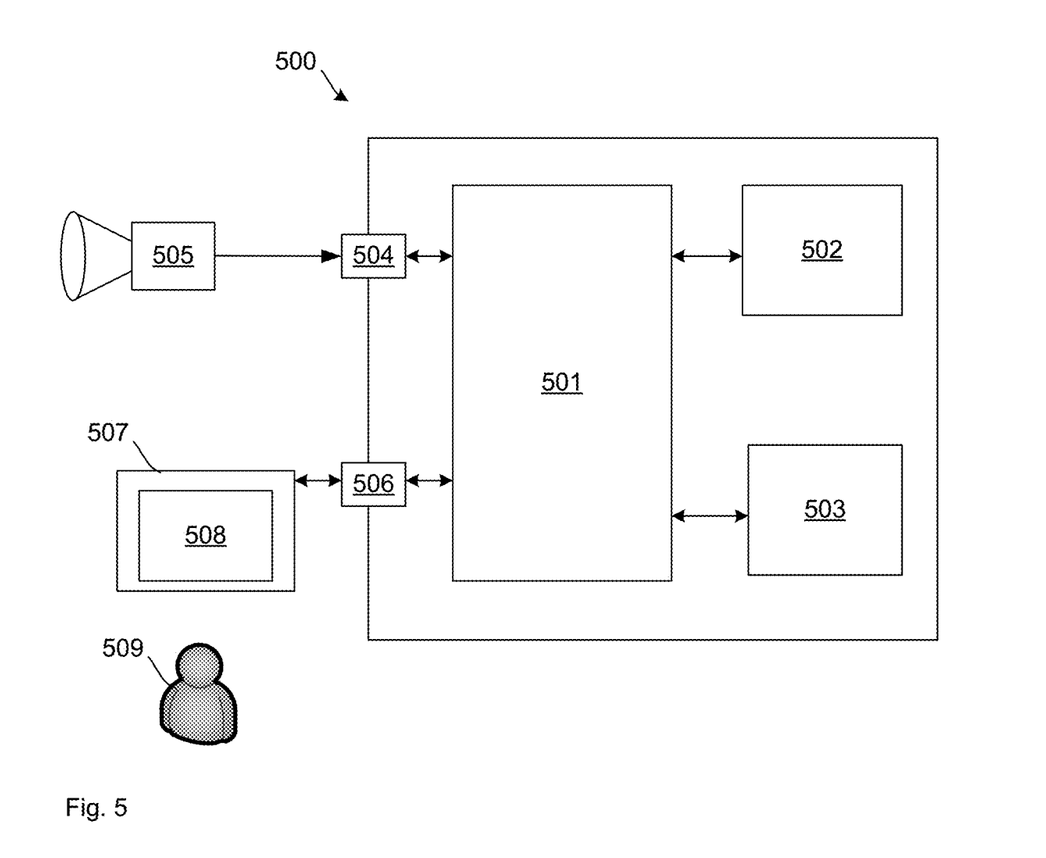
FIG. 5 illustrates a computer system for processing image data.

FIG. 5 illustrates a computer system 500 for processing image data. It is noted that the computer system 500 may be integrated into a camera or a smart phone. The computer system 500 comprises a processor 501 connected to a program memory 502, a data memory 503, a communication port 504 and a user port 505. The program memory 502 is a non-transitory computer readable medium, such as a hard drive, a solid state disk or CD-ROM. Software, that is, an executable program stored on program memory 502 causes the processor 501 to perform the method in FIG. 4, that is, processor 501 receives an input mosaic image, applies a trained neural network on the input mosaic image and creates an output mosaic image with a higher resolution than the input image. The data memory 503 may store the trained neural network in the form of network parameters that have been optimised on training images as explained below.

The processor 501 may then store the output image on data memory 503, such as on RAM or a processor register. Processor 501 may also send the determined output image via communication port 504 to a server, such as an image server or internet server.

The processor 501 may receive data, such as the mosaic input image, from data memory 503 as well as from the communications port 504, which is connected to a camera 505. The camera may be a three-channel or RGB camera or a hyperspectral camera. In any case, the camera provides raw image data in the sense that the image data represents a mosaic image. Computer system 500 further comprises user port 506, which is connected to a display 507 that shows the high resolution output image 508 to a user 509. Display 507 may enable user 509 to zoom into the output image and since the resolution of the output image is higher than the input image, the zoomed image provides more detail than the input image, which becomes more noticeable at high zoom levels. In one example, processor 501 performs de-mosaic-ing of the high-resolution output mosaic image to generate a high-resolution output RGB image for display or a high-resolution hyperspectral image cube for further processing, such as for object detection. Processor 501 may also perform object detection, such as by using a further neural network on the output high-resolution mosaic image or the converted high-resolution RGB image. Processor 501 may then indi-cate the detected objects to the user or automatically trigger an action in response to detecting an object (such as a change in speed and/or direction of an autonomous vehicle).

In one example, the processor 501 receives and processes the input image in real time. This means that the processor 501 determines the output image every time an input image is received from camera 505 and completes this calculation before the camera 505 captures and sends the next image update. In this sense, processor 501 can process a video stream in real-time in order to increase the resolution of the video data and create a super-resolution output.

Although communications port 504 and user port 506 are shown as distinct entities, it is to be understood that any kind of data port may be used to receive data, such as a network connection, a memory interface, a pin of the chip package of processor 501, or logical ports, such as IP sockets or parameters of functions stored on program memory 502 and executed by processor 501. These parameters may be stored on data memory 503 and may be handled by-value or by-reference, that is, as a pointer, in the source code.

The processor 501 may receive data through all these interfaces, which includes memory access of volatile memory, such as cache or RAM, or non-volatile memory, such as an optical disk drive, hard disk drive, storage server or cloud storage. The computer system 500 may further be implemented within a cloud computing environment, such as a managed group of interconnected servers hosting a dynamic number of virtual machines.

It is to be understood that any receiving step may be preceded by the processor 501 determining or computing the data that is later received. For example, the processor 501 determines the image data and stores the image in data memory 503, such as RAM or a processor register. The processor 501 then requests the data from the data memory 503, such as by providing a read signal together with a memory address. The data memory 503 provides the data as a voltage signal on a physical bit line and the processor 501 receives the image data as the input image via a memory interface.

FIG. 4 is to be understood as a blueprint for the software program and may be implemented step-by-step, such that each step in FIG. 4 is represented by a function in a programming language, such as C++ or Java. The resulting source code is then compiled and stored as computer executable instructions on program memory 502.

It is noted that for most humans performing the method 400 manually, that is, without the help of a computer, would be practically impossible. Therefore, the use of a computer is part of the substance of the invention and allows performing the necessary calculations that would otherwise not be possible due to the large amount of data and the large number of calculations that are involved.

Neural Network

It is noted that the mathematical details of the neural network are provided below. In summary, the neural network comprises two sub-networks. A first sub-network comprises a convolutional neural network comprising a sequential series of five steps of residual blocks (each comprising a residual channel attention network RCAN). Each step of the sequential series has an input and an output. The processor uses the output of one of the steps as an input to perform a subsequent step in the series.

Each step may comprise a residual group. Such a residual group can comprise multiple neural network layers, and a direct connection from an input of one of the multiple neural network layers to an output of another one of the multiple neural network layers. This way, the input can be passed directly to the output bypassing one, multiple or all network layers. Further, the gradient can flow directly in the opposite direction, assisting in training the neural network.

In some examples, the first sub-network comprises a sequential series of exactly five steps and each step has a convolutional layer. That layer is configured to operate on a receptive field that is larger for one of the convolutional layers than the receptive field of a previous one of the convolutional layers. This will be described in more detail with reference to FIG. 6, but it is noted here that the receptive field of step 2 (performed by RG 607) is larger than receptive field of step 1 (performed by RG 604), which is because each layer in those steps expends the receptive field.

In one example, each step comprises two convolutional layers with kernel size 3×3, dilation 1, and an output size that is identical to an input size of that step.

Receptive Field

The receptive field is defined as the region in the input space that a particular CNN's feature is looking at (i.e. be affected by). A receptive field of a feature can be described by its centre location and its size. However, not all pixels in a receptive field are equally important to its corresponding CNN's feature. Within a receptive field, the closer a pixel to the centre of the field, the more it contributes to the calculation of the output feature. Which means that a feature does not only look at a particular region (i.e. its receptive field) in the input image, but also focus exponentially more to the middle of that region.

To calculate the receptive field in each layer, besides the number of features n in each dimension, we keep track of some extra information for each layer. These include the current receptive field size r, the distance between two adjacent features (or jump) j, and the centre coordinate of the upper left feature (the first feature) start. Note that the centre coordinate of a feature is defined to be the centre coordinate of its receptive field. When applying a convolution with the kernel size k, the padding size p, and the stride size s, the attributes of the output layer can be calculated by the following equations:

$$n_{out} = \left\lfloor \frac{n_{in} + 2p - k}{s} \right\rfloor + 1$$

$$j_{out} = j_{in} * s$$

$$r_{out} = r_{in} + (k - 1) * j_{in}$$

$$start_{out} = start_{in} + \left(\frac{k-1}{2} - p\right) * j_{in}$$

The first equation calculates the number of output features based on the number of input features and the convolution properties.

The second equation calculates the jump in the output feature map, which is equal to the jump in the input map times the number of input features that you jump over when applying the convolution (the stride size).

The third equation calculates the receptive field size of the output feature map, which is equal to the area that covered by k input features (k−1)*j_in plus the extra area that covered by the receptive field of the input feature that on the border.

The fourth equation calculates the centre position of the receptive field of the first output feature, which is equal to the centre position of the first input feature plus the distance from the location of the first input feature to the centre of the first convolution (k−1)/2*j_in minus the padding space p*j_in. Note that we need to multiply with the jump of the input feature map in both cases to get the actual distance/space.

The first layer is the input layer, which has n=image size, r=1, j=1, and start=0.5. By applying the four above equations recursively, we can calculate the receptive field information for all feature maps in a CNN.

Sequence Analysis Network

The trained neural network then further comprises a second neural sub-network. This second sub-network is configured to process an ordered linear sequence of inputs, such as in a recurrent neural network (RNN) for sequence analysis (e.g. speech). Instead of words in speech processing, the ordered linear sequence of inputs is here obtained from the output of each step of the sequential series of multiple steps of the first neural sub-network. That is, the output of each residual group of the first sub-network is used as a part of the series that is the input to the second sub-network. Since the output of each residual group is an image, the internal matrix multiplications of the RNN are exchanged with convolution operations. Long short-term memory (LSTM) is an advancement of RNNs including. An LSTM unit is composed of a cell, an input gate, an output gate and a forget gate. The cell remembers values over arbitrary time intervals and the three gates regulate the flow of information into and out of the cell.

As explained below, the second neural sub-network may comprise a convolutional long short-term memory (convLSTM). As a result, the convolutional LSTM at the input of the second neural network learns the sequential relationship between different wavelengths of the network.

Processor 501 then creates the high-resolution mosaic output image by calculating a combination of a first output feature map of the first neural sub-network (that is the last residual group) with a second output feature map from the second neural sub-network. This may involve calculating a transposed convolution of the combination to determine a high-resolution mosaic output image from the combination of feature maps.

In summary, processor 501 receives a low-resolution mosaic input image and evaluates the first neural sub-network using the low-resolution mosaic input image. The first neural sub-network comprises a sequential series of multiple steps and an attention mechanism between each of the multiple steps. The attention mechanism is configured to create a receptive field in each step that is greater than the receptive field of a previous step. Processor 501 then evaluates a second neural sub-network that is configured to process an ordered linear sequence of inputs. The ordered linear sequence of inputs is obtained from an output of each step of the sequential series of multiple steps of the first neural sub-network. Then, processor 501 calculates a combination of a first output feature map of the first neural network with a second output feature map from the second neural network and finally, calculates a transposed convolution of the combination to determine a high-resolution mosaic output image from the combination of feature maps.

Training

Reference is made above to a trained neural network. It is understood that this trained neural network is characterised by parameter values of the neural network. That is, if the parameters are available and they predict an expected output accurately, the neural network is considered to be 'trained'. The parameter values include weights as well as feature maps, that is, pixel values for feature 'images'.

Training the neural network uses a training set of images that comprises low-resolution mosaic images and high-resolution mosaic images. It is noted that some datasets only include high-resolution mosaic images, which can then be down-sampled to generate the low resolution input mosaic learning images. For each pair of training images (containing a low-resolution and a high-resolution image), processor 501 calculates an error value and adjusts the parameters of the neural network to reduce that error value. After repeating these steps for many images (such as 1,000 or 10,000) in the training set, the error value converges and the parameters are optimised, which results in a 'trained' neural network. The training images may be selected specifically for a given application of the method, such as only satellite images, only images of traffic scenes, or images of biological samples.

It is further noted that the training may be performed by processor 501 or by a different computer system. In the latter case, the parameters are transmitted to processor 501 so that processor can apply the trained network to the input image. In that evaluation scenario, the high-resolution output image is not available but to be created by processor 501 as described herein.

DETAILED EXAMPLE

Disclosed herein is an effective use of a convolutional long short-term memory (ConvLSTM) module to learn the relationship between features from different stages of a CNN with sequentially increasing receptive fields, and achieve state-of-the-art in mosaic super-resolution (SR), which means creating an output image with a resolution that is higher than the input image.

In this disclosure, SR is applied to mosaic images directly. This disclosure further provides different attention mechanisms and an assessment of their relative performance in the network. Furthermore, this disclosure investigates the structure of an LSTM module, where elements of it are designed to apply implicit attention. By incorporating the LSTM inspired attention mechanism into the network, it is shown that performance is superior compared to other attention mechanisms.

Method Details

Figure 6:
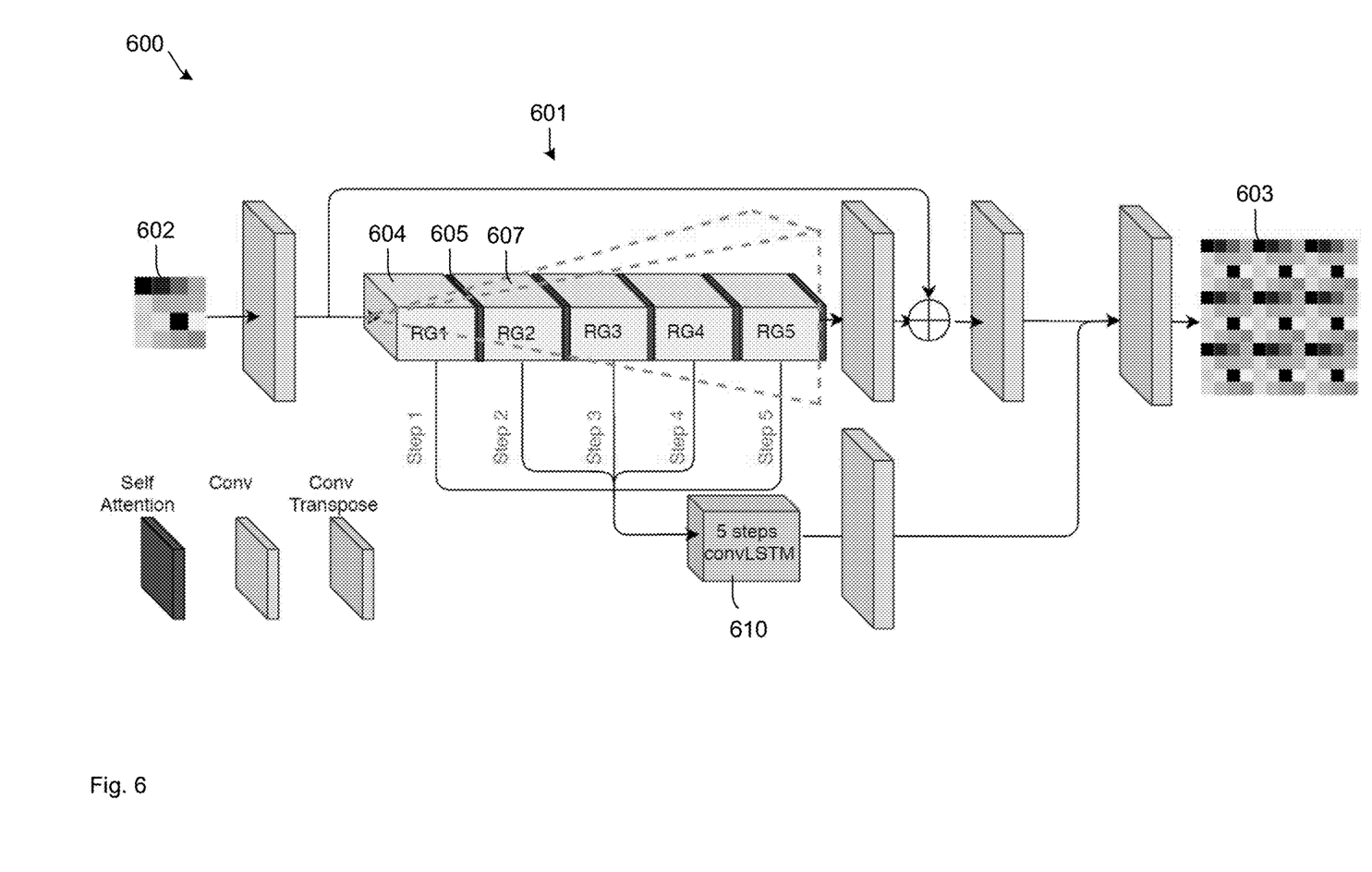
FIG. 6 illustrates a super-resolution network. This model gets as input an LR mosaic image and ×3 super-resolves it to HR mosaic image. The network is based on a residual convolutional attention network with five residual groups (RGs) and three residual blocks (RBs).

FIG. 6 illustrates an example network 600 that is based on a simplified residual channel attention network (RCAN) 601 as the backbone for the method. Network 600 receives a low resolution mosaic input image 602, and is applied, after training, to the input mosaic image 602, and calculates a high-resolution output mosaic image 603. The trained neural network 600 comprises an RCAN 601. The multi-spectral RCAN 601 consists of five residual groups (RGs), such as first residual group 604, and each RG has three residual blocks (RBS) and each RB has one channel attention (CA) mechanism. The features from each RG can be utilized better if higher level of aggregations are considered. In other words, one can better utilize the intermediate features if the dependencies between different RGs are taken into account. To this end, the output of each RG is treated as a separate representation, processing them in a pyramid Bidirectional ConvLSTM 610 to learn relations between features of various receptive fields.

Bidirectional Pyramid ConvLSTM

Bidirectional LSTM 610 is capable of learning relations in both the forward and backward directions, providing the model with stronger representation compared to its unidirectional counterpart. In the present case, processor 501 treats the output of each RG in the backbone RCAN 601 as a sequence of feature maps. In other words, the features at different receptive fields act as the features at different time-steps. Since the feature maps carry strong spatial information, processor 501 utilizes a bidirectional ConvLSTM 610.

A ConvLSTM takes a sequence (in the current case pyramid receptive fields which are output features of the RCAN RGs $X_t$) as input and applies the following operation on them:

$$i_t = \sigma(W_{xi}^* X_t + W_{hi}^* H_{t-1} + W_{ci} e C_{t-1} + b_i) \quad (1)$$
$$f_t = \sigma(W_{xf}^* X_t + W_{hf}^* H_{t-1} + W_{cf} e C_{t-1} + b_f)$$
$$C_t = f_t e C_{t-1} + i_t e \tanh(W_{xc}^* X_t + W_{hc}^* H_{t-1} + b_c)$$
$$o_t = \sigma(W_{xo}^* X_t + W_{ho}^* H_{t-1} + W_{co} e C_t + b_o)$$
$$H_t = o_t e \tanh(C_t)$$

where $i_t$, $f_t$ and $o_t$ are input, forget, and output gate of a ConvLSTM cell. $C_t$ denotes the cell state which is passed to the next ConvLSTM cell and $H_t$ indicates the output features of a ConvLSTM cell. Here *, and e refers to the convolution operation and Hadamard product. σ is a Sigmoid function. The Bidirectional ConvLSTM 510 has five steps for the features of 5 RGs, and it maintains two sets of hidden and state cells per unit, for back and forth sequences. This allows Bidirectional ConvLSTM 510 to have access to receptive field contexts in both directions and therefore increases the performance of the proposed network.

Since the features representing each time-step carry information at different receptive fields (with respect to the input), the design of ConvLSTM 610 can be considered a Pyramid, thus naming this component Pyramid ConvLSTM.

Self Attention Mechanism

Figure 7:
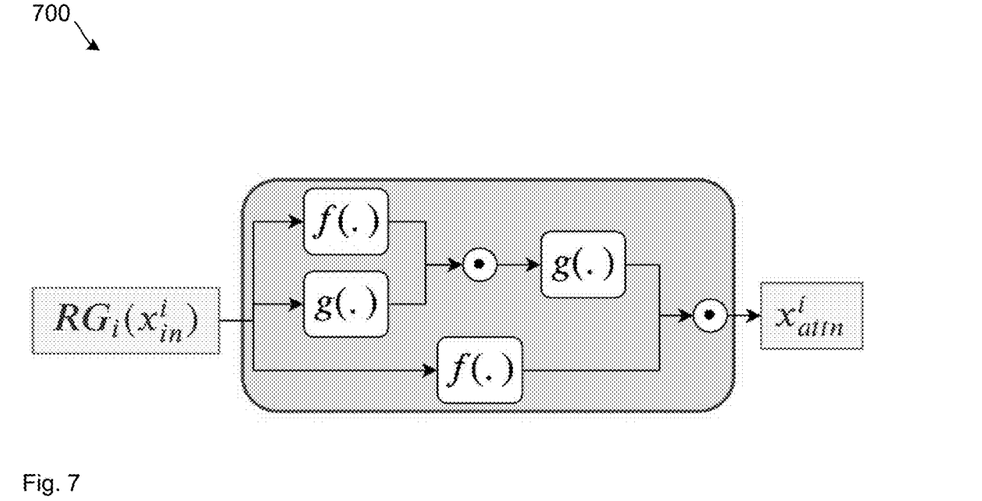
FIG. 7 illustrates a self-attention mechanism, where f(.) is a Sigmoid function and g(.) is a Tan h function.

FIG. 7 illustrates a self-attention mechanism, where f(.) is a Sigmoid function and g(.) is a Tan h function. An LSTM by design provides implicit attention to input features and selectively passes more vital information to the next stage. The structure in FIG. 7 is equivalent to an LSTM cell with only one step and with zero-initialized hidden and cell states. If this structure is inserted between different RGs (such as RG 604) as indicated at 605, the first Tan h followed by a Sigmoid applies a non-linearity on the input feature map and then performs a gating operation, determining what information is passed to the next stage. Processor 501 repeats this process twice to provide additional non-linearity and gating. The self-attention mechanism 605 gets as input the output of 604 and applies the following function:

$$x_{attn}^j = f(RG_i(x_{in}^i)) e g(f(RG_i(x_{in}^i) e g(RG_i(x_{in}^i))) \quad (2)$$

where $RG_i$ is the $i^{th}$ RG, $x_{in}^i$ is the input feature map to the $i^{th}$ RG, and $x_{attn}^j$ is the resulting feature map for its corresponding input. f and g are the non-linear functions of Sigmoid, and Tan h (hyperbolic tangent function) respectively.

As mentioned before, the attention mechanism shown in Eq. 2, can be considered equivalent to the internal operations of a convolutional LSTM when the cell states carry no information. This is well-suited to this task since any relation to other RGs can be ignored and refined features computed based only on the output of the current RG, acting as self-attention.

Loss Functions

In some examples, a loss function such as $L_1$ or $L_2$ or a perceptual loss function such as structural similarity index measure (SSIM) can be used to train models. Here, for consistency, processor 501 uses $L_1$ loss as a baseline loss function since an $L_1$ function is less sensitive to outliers compared to an $L_2$ function. It is possible to use the PyTorch SmoothL$_1$ implementation, which is a more stable implementation compared to the vanilla $L_1$. SmoothL$_1$ can be expressed as $$SmoothL_1(\Theta) = \frac{1}{N} \sum_{i=1}^{M} Z^i \quad (3)$$

where $$Z^i = \begin{cases} 0.5 \times (DIF)^2 & \text{if } |DIF| < 1 \\ |DIF| - 0.5 & \text{otherwise,} \end{cases}$$

and $$DIF = HR_{RGB}^i - LR_{MS}^i.$$

Dataset Generation

Multi-Spectral Dataset.

We generate high-resolution (HR) and low-resolution (LR) mosaic images from HR multi-spectral cubes in the StereoMSI dataset, by taking the spatial offset of each wavelength in a multi-spectral pixel into account. The HR multi-spectral cubes have a dimension of 14×240×480, and LR×3 have a dimension of 14×80×160. The multi-spectral images have 16 channels and each pixel exhibit a 4×4 pattern. However, as a result of the particular camera that captured these images, two of these channels are spectrally redundant and are not present, leaving us with 14 channels. We transform this 14 channel cube to a mosaic pattern. For the two redundant wavelengths, we assign zero value. In FIG. 6, these two wavelengths are indicated by black pixels. The resulting HR and LR mosaic training images have dimensions 1×960×1920, and 1×320×640 respectively.

Bayer Dataset

Regarding the Bayer dataset, an extended StereoMSI dataset has become available. The size of the images is 1086×2046. To generate LR mosaic images, the HR mosaic was used to build an image cube of size 4×362×682. The 4 channels correspond to two green, one red, and one blue. The image cubes were down-sampled and used to reconstruct LR mosaic images.

Converting Multi-Spectral Mosaics to Zero Padded Multi-Spectral Cubes.

It is possible to convert multi-spectral mosaics into the format of zero-padded multi-spectral cubes (for simplicity, we refer to this format as mosaic cubes) as a way to give the network an extra wavelength dimension and they showed that this data representation helps achieve better performance. We verify that this data representation indeed helps us boost our quantitative results for multi-spectral SR. Please note that we use the cubic data format as the input, and the corresponding, actual, mosaic images are used as ground truth.

Experiments

Dataset:

We evaluate our approach on the PIRM2018 spectral SR challenge dataset as our multi-spectral mosaic SR evaluation. We use their extended Bayer images available for RGB mosaic SR evaluation. With the multi-spectral dataset, we have 350 HR-LR image pairs with 300 images used for training and 30 and 20 images set aside for validation and testing, respectively. For the Bayer dataset, to stay within a comparable dataset size, we have 300 training image pairs, 50 for validation, and 50 for testing.

Evaluation Metrics:

The 20 (multi-spectral) and 50 (Bayer) test images were super-resolved to a scale of ×3 and evaluated using the Pixel Signal to Noise Ratio (PSNR) and Structural Similarity Index (SSIM) metrics. For the SSIM metric, a window size of 7 is used with the metric being calculated for each channel and then averaged.

Training Settings:

During training, we performed data augmentation on each mini-batch of 16 images which included random 60×60 cropping of the input image, random rotation by 0°, 90°, 180°, 270° with p=0.25, and random horizontal flips with p=0.5. Our model is trained by the ADAM optimizer with $\beta_1=0.9$, $\beta_2=0.999$, and $\epsilon=10^{-8}$. The initial learning rate was set to $10^{-4}$ and then halved every 2500 epochs. To implement our models, we used the PyTorch framework. To test our algorithms, we select the models with the best performance on the validation set and present the test results for those models.

Results

Multi-Spectral Mosaic SR

TABLE 1

Mean and standard deviation (in parenthesis) of PSNR, SSIM on the Multi-spectral dataset. Except where specified, the networks are input with zero-padded cubic mosaics. RCAN⁻ indicates RCAN without CA.

| Method | PSNR | SSIM |
| --- | --- | --- |
| Bicubic | 28.63 | 0.4552 |
| | (3.50) | (0.0691) |
| RCAN (Mosaic) | 33.17 | 0.6500 |
| | (3.62) | (0.061) |
| RCAN⁻ (Mosaic) | 33.15 | 0.6472 |
| | (3.64) | (0.0614) |
| RCAN⁻ | 33.16 | 0.6492 |
| | (3.65) | (0.0616) |
| RCAN | 33.21 | 0.6500 |
| | (3.64) | (0.0610) |
| PyrRCAN | <u>33.293</u> | <u>0.6535</u> |
| | (3.70) | (0.0618) |
| PyrRCAN + lstmA | 33.31 | 0.6522 |
| | (0.0625) | (0.0625) |

To assess the effect of using a mosaic vs. mosaic cube format, In Table 1, we first train our baseline RCAN on mosaic data and mosaic cubes with LR input (the mosaic format is always used for HR ground truth), with and without CA (the first four rows). As explained before, and according to the results, the CA mechanism improves the performance more when using a mosaic cube data format compared with the mosaic data format. Moreover, the zero-padded cube data format improves the results compared to mosaic data by 0.04 dB. The rest of the experiments in Table 2 are carried out with a zero-padded cube data format as the input, and mosaic data format as the output. In all the tables, best and second-best results are shown in bold and underlined fonts, respectively.

Figure 8:
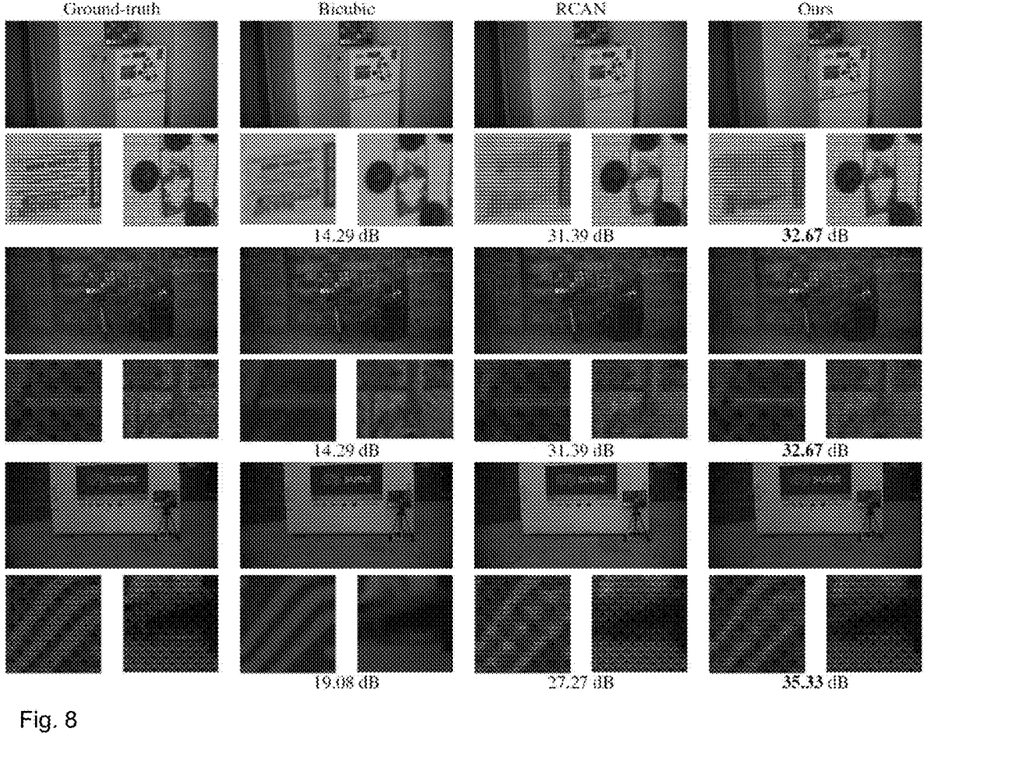
FIG. 8 illustrates qualitative results for Bayer SR. Note, PSNR results per baseline are provided in the corresponding columns.

The fifth row of Table 1 shows the effect of our Pyramid ConvLSTM structure, which has led to a considerable 0.08 dB improvement in PSNR. The utilization of our proposed ConvLSTM attention module, (lstmA), boosts the results by an additional 0.02 dB. In total, our proposed method boosts the SOTA approaches by 0.10 dB. Taking into account the effect of using mosaic cubes, our improvement adds up to 0.14 dB. Note that compared to the top PIRM2018 algorithms, our algorithm clearly outperforms existing methods. It is worth noting that no self-ensemble algorithm was used in the post-processing stage to achieve further improvements. These results purely demonstrate the effectiveness of our Pyramid ConvLSTM module boosted slightly by our lstmA module. Qualitative results, depicted in FIG. 8, are also evident of the superiority of our method.

Bayer SR

Figure 9:
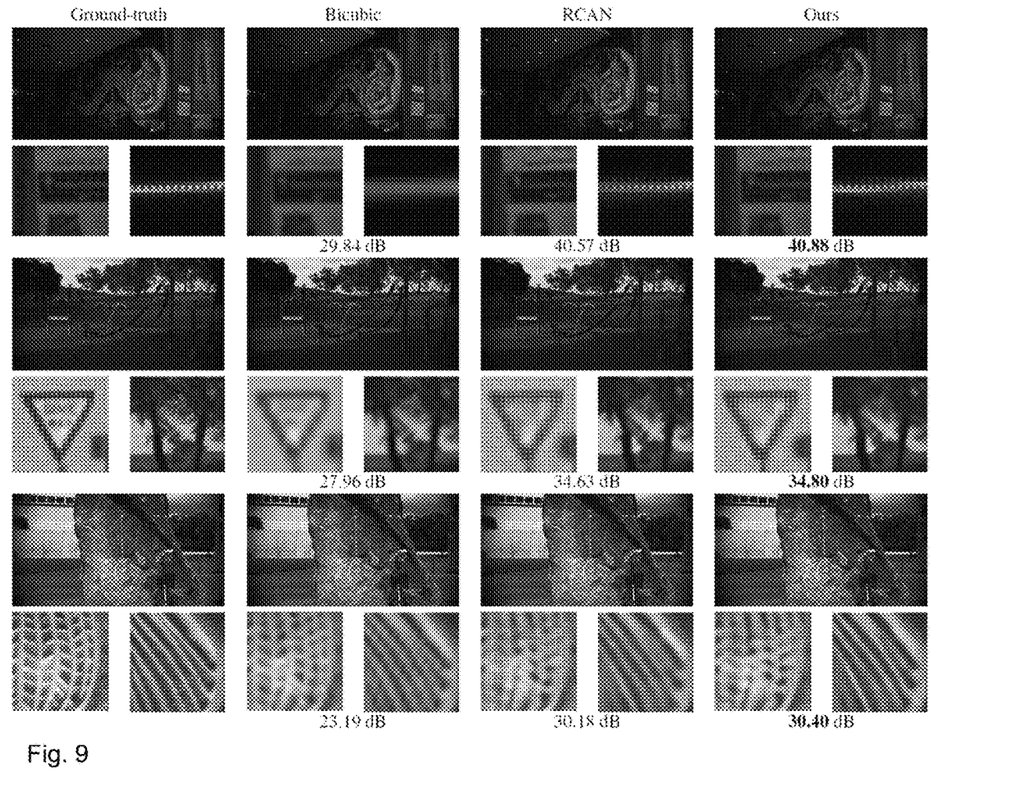
FIG. 9 illustrates further qualitative results for Bayer SR. Note, PSNR results per baseline are provided in the corresponding columns.

We use the mosaic data format for the Bayer SR task. The results are provided in Table 2 below. The first two rows demonstrate the effect of CA, indicating that the model may not be able to take advantage of CA when uses Bayer data. Overall, our Pyramid ConvLSTM structure, together with the lstmA module, outperforms the baselines in terms of PSNR metric by 0.07 dB. Qualitative results, depicted in FIG. 9, are also evidence of the superiority of our method. Note, to the best of our knowledge, there are no specialized SR algorithms available on Bayer SR. Hence, we only compare with a bicubic baseline, which is customary in SR literature as well as the RCAN implementation that is SOTA in multi-spectral SR (RCAN is also SOTA in standard RGB SR). The closest algorithm to ours, as mentioned above, is which carries out joint demosaicing, and SR does not produce mosaic images).

TABLE 2

Mean and standard deviation (in parenthesis) of PSNR, SSIM for the Bayer dataset. RCAN⁻ indicates RCAN without CA.

| Method | PSNR | SSIM |
| --- | --- | --- |
| Bicubic | 28.63 | 0.6398 |
| | (3.50) | (0.1364) |
| RCAN | 30.63 | 0.6560 |
| | (3.65) | (0.0998) |
| RCAN⁻ | 30.66 | 0.6589 |
| | (3.65) | (0.0988) |
| PyrRCAN⁻ + lstmA | 30.70 | 0.6609 |
| | (3.65) | (0.1000) |

Effect of ConvLSTM in PyrRCAN

TABLE 3

Effect of Pyramid ConvLSTM

| Method | PSNR | SSIM |
| --- | --- | --- |
| Multi-spectral mosaic SR | | |
| PyrRCAN w/o ConvLSTM | 33.21 | 0.6514 |
| PyrRCAN | 33.29 | 0.6535 |
| Bayer mosaic SR | | |
| PyrRCAN w/o ConvLSTM | 30.591 | 0.655 |
| PyrRCAN | 30.653 | 0.6582 |

Here, we aim to assess whether the ConvLSTM is learning the sequence of the concatenated feature pyramid from features from different field of view, or it is merely the effect of reusing the intermediate features. We choose the PyrRCAN⁻ structure, without our lstmA module, to better isolate the effect of the ConvLSTM module. We remove the ConvLSTM module and instead feed the features into the convolutional layer that follows the ConvLSTM in FIG. 6. The results, presented in Table 3, show the ConvLSTM module is indeed learning additional information from the concatenated features. In fact, without the ConvLSTM module, the results are worse than the baselines.

Effect of Attention

TABLE 4

Ablation on different attention methods.

| Method | PSNR | SSIM |
|---|---|---|
| Multi-spectral mosaic SR | | |
| PyrRCAN⁻ + CA(RCAN) | 33.22 (3.6857) | 0.6512 (0.06185) |
| PyrRCAN⁻ + CA | 33.22 (3.67) | 0.6511 (0.0622) |
| PyrRCAN⁻ + Bi-linear attention | 33.24 (3.67) | 0.6517 (0.06277) |
| PyrRCAN⁻ + lstm w/o Sigmoid | 33.22 (3.712) | 0.6475 (0.6475) |
| PyrRCAN⁻ + lstmA | 33.26 (3.70) | 0.6513 (0.0622) |
| Bayer mosaic SR | | |
| PyrRCAN⁻ + CA(RCAN) | 30.65 (3.6582) | 0.6580 (0.1001) |
| PyrRCAN⁻ + CA | 30.63 (3.69573) | 0.6576 (0.09949) |
| PyrRCAN⁻ + Bi-linear attention | 30.63 (3.652) | 0.6546 (0.0998) |
| PyrRCAN⁻ + lstmA w/o Sigmoid | 30.67 (3.664) | 0.6612 (0.0998) |
| PyrRCAN⁻ + lstmA | 30.700 (3.658) | 0.6609 (0.1000) |

As discussed above, we investigate the effect of different attention mechanisms 605 when placed between the RGs (such as 604), guided by the intuition that such a mechanism can facilitate more effective information flow between the RGs. To assess the effect of these mechanisms more directly, we remove CA from RCAN, so the networks under study only use one type of attention mechanism and only between RGs. The results show that our proposed lstmA mechanism outperforms all the other methods, and it is even marginally superior to BLA. The results of the ablation study for Bayer mosaic SR follow a more or less similar trend as the results on multi-spectral mosaic SR.

This disclosure provides a super-resolution method designed explicitly for mosaic super-resolution. The method exhibit SOTA performance, achieved primarily via constructing a sequential feature pyramid and exploiting a ConvLSTM module 610 to learn the inter-dependencies in the sequence. Provided are also different attention modules, replacing CA in RCAN, and observed that an LSTM inspired attention mechanism provides the most significant improvement.

It is shown that mosaic and demosaiced images are different, and algorithms specific to each format need to be developed. Also, if a real-life application requires an SR algorithm, it is advantageous to capture Bayer images, which contain more high-frequency information, given that most modern RGB cameras are capable of outputting Bayer patterns. Hence, it is more beneficial to the computer vision community (microscopy, astronomy, food monitoring).

It will be appreciated by persons skilled in the art that numerous variations and/or modifications may be made to the above-described embodiments, without departing from the broad general scope of the present disclosure. The present embodiments are, therefore, to be considered in all respects as illustrative and not restrictive.

The invention claimed is:

1. A method for image processing, the method comprising:
receiving a low-resolution mosaic input image;
applying a trained first neural sub-network to the low-resolution mosaic input image, the first neural sub-network comprising a sequential series of multiple steps, each of the multiple steps having a convolutional layer to calculate a feature map as an output of that step;
forming an ordered linear sequence of multiple feature maps, the ordered linear sequence containing each feature map calculated by the respective convolutional layer of each of the multiple steps of the first neural sub-network, the multiple feature maps being in the order of the multiple steps of the first neural sub-network;
processing the ordered linear sequence, by a trained second neural sub-network; and
creating a high-resolution mosaic output image based on outputs of the first neural sub-network and the second neural sub-network, wherein each of the low-resolution mosaic image and the high-resolution mosaic image is represented by two-dimensional image data comprising, for each pixel, multiple elements corresponding to intensity values of different spectral bands arranged adjacent to each other in two dimensions to form a Bayer pattern, such that each intensity value has a unique location in the Bayer pattern and each intensity value is associated with a different location in the high-resolution mosaic image.

2. The method of claim 1, wherein
the method further comprises using the output of one of the multiple steps as an input to perform a subsequent step in the series.

3. The method of claim 1, wherein each step of the sequential series comprises a residual group comprising:
multiple neural network layers, and
a direct connection from an input of one of the multiple neural network layers to an output of another one of the multiple neural network layers.

4. The method of claim 1, wherein the sequential series has exactly five steps.

5. The method of claim 3, wherein the multiple neural network layers comprise convolutional layers configured to operate on a receptive field that is larger for one of the convolutional layers than the receptive field of a previous one of the convolutional layers.

6. The method of claim 5, wherein the receptive field of convolutional layers of one of the multiple steps is larger than the receptive field of convolutional layers of a previous one of the multiple steps.

7. The method of claim 5, wherein the convolutional layers are configured to perform dilated convolution to increase the receptive field in each of the convolutional layers.

8. The method of claim 5, wherein each step comprises two convolutional layers with kernel size 3×3, dilation 1, and an output size that is identical to an input size of that step.

9. The method of claim 1, wherein the first neural sub-network further comprises an attention mechanism between each of the multiple steps.

10. The method of claim 9, wherein the attention mechanism is a self-attention mechanism configured to compute features based only on the output of the previous step.

11. The method of claim 9, wherein the attention mechanism comprises a sigmoid function and a tan h function.

12. The method of claim 1, wherein the second neural sub-network comprises a convolutional long short-term memory (convLSTM).

13. The method of claim 12, further comprising using the convolutional LSTM at the input of the second neural network to learn the sequential relationship between different wavelengths of the network.

14. The method of claim 1, wherein creating the high-resolution mosaic output image comprises calculating a combination of a first output feature map of the first neural sub-network with a second output feature map from the second neural sub-network.

15. The method of claim 14, wherein creating the high-resolution mosaic output image further comprises calculating a transposed convolution of the combination to determine a high-resolution mosaic output image from the combination of feature maps.

16. The method of claim 1, wherein each pixel of the low-resolution mosaic input image and the high-resolution mosaic output image comprises intensity values for more than three spectral bands.

17. A method for image processing, the method comprising:
receiving a low-resolution mosaic input image;
applying a trained first neural sub-network using the low-resolution mosaic input image, the first neural sub-network comprising a sequential series of multiple steps and an attention mechanism between each of the multiple steps, each of the multiple steps having a convolutional layer to calculate a feature map as an output of that step, the attention mechanism being configured to create a receptive field in each step that is greater than the receptive field of a previous step;
forming an ordered linear sequence of multiple feature maps, the ordered linear sequence containing each feature map calculated by the respective convolutional layer of each of the multiple steps of the first neural sub-network, the multiple feature maps being in the order of the multiple steps of the first neural sub-network;
processing the ordered linear sequence, by a trained second neural sub-network;
calculating a combination of a first output feature map of the first neural sub-network with a second output feature map from the second neural sub-network; and
calculating a transposed convolution of the combination to determine a high-resolution mosaic output image from the combination of feature maps, wherein each of the low-resolution mosaic image and the high-resolution mosaic image is represented by two-dimensional image data comprising, for each pixel, multiple elements corresponding to intensity values of different spectral bands arranged adjacent to each other in two dimensions to form a Bayer pattern, such that each intensity value has a unique location in the Bayer pattern and each intensity value is associated with a different location in the high-resolution mosaic image.

18. A computer system for image processing, the computer system comprising:
an input port configured to receive a low-resolution mosaic input image;
a processor configured to:
apply a trained first neural sub-network to the low-resolution mosaic input image, the first neural sub-network comprising a sequential series of multiple steps, each of the multiple steps having a convolutional layer to calculate a feature map as an output of that step;
form an ordered linear sequence of multiple feature maps, the ordered linear sequence containing each feature map calculated by the respective convolutional layer of each of the multiple steps of the first neural sub-network, the multiple feature maps being in the order of the multiple steps of the first neural sub-network;
process the ordered linear sequence, by a trained second neural sub-network; and
create a high-resolution mosaic output image based on outputs of the first neural sub-network and the second neural sub-network, wherein each of the low-resolution mosaic image and the high-resolution mosaic image is represented by two-dimensional image data comprising, for each pixel, multiple elements corresponding to intensity values of different spectral bands arranged adjacent to each other in two dimensions to form a Bayer pattern, such that each intensity value has a unique location in the Bayer pattern and each intensity value is associated with a different location in the high-resolution mosaic image.

* * * * *

UNITED STATES PATENT AND TRADEMARK OFFICE
CERTIFICATE OF CORRECTION

PATENT NO. : 11,532,071 B2
APPLICATION NO. : 17/345937
DATED : December 20, 2022
INVENTOR(S) : Lars Petersson et al.

Page 1 of 2

It is certified that error appears in the above-identified patent and that said Letters Patent is hereby corrected as shown below:

In the Specification

Column 2, Line 43, delete "tan h" and insert in its place --tanh--.

Column 3, Line 56, delete "Tan h" and insert in its place --Tanh--.

Column 10, Line 51, delete "(RBS)" and insert in its place --(RBs)--.

Column 11, delete the five equations labeled "(1)" approx. between Lines 10-16, and insert in its place $$i_t = \sigma(W_{xi} * X_t + W_{hi} * H_{t-1} + W_{ci} \odot C_{t-1} + b_i)$$
$$f_t = \sigma(W_{xf} * X_t + W_{hf} * H_{t-1} + W_{cf} \odot C_{t-1} + b_f)$$
$$C_t = f_t \odot C_{t-1} + i_t \odot \tanh(W_{xc} * X_t + W_{hc} * H_{t-1} + b_c) \quad (1)$$
$$o_t = \sigma(W_{xo} * X_t + W_{ho} * H_{t-1} + W_{co} \odot C_t + b_o)$$
$$H_t = o_t \odot \tanh(C_t)$$

--.

Column 11, Line 22, delete "and e" and insert in its place --and $\odot$--.

Column 11, Line 37, delete "Tan h" and insert in its place --Tanh--.

Column 11, Line 43, delete "Tan h" and insert in its place --Tanh--.

Column 11, delete the one equation labeled "(2)" approx. between Lines 50-55, and insert in its place -

$$x_{attn}^i = \frac{f(RG_i(x_{in}^i)) \odot}{g(f(RG_i(x_{in}^i) \odot g(RG_i(x_{in}^i)))} \quad (2)$$

--.

Column 11, Line 59, delete "Tan h" and insert in its place --Tanh--.

In the Claims

Signed and Sealed this
Sixth Day of June, 2023

*Katherine Kelly Vidal*

Katherine Kelly Vidal
*Director of the United States Patent and Trademark Office*

Column 17, Claim 11, Line 2, delete "tan h" and insert in its place --tanh--.